Aug. 11, 1925.
R. P. WHITE
1,548,861
HOLDER FOR VESSELS HAVING REMOVABLE LIDS
Filed March 20, 1922  2 Sheets-Sheet 1
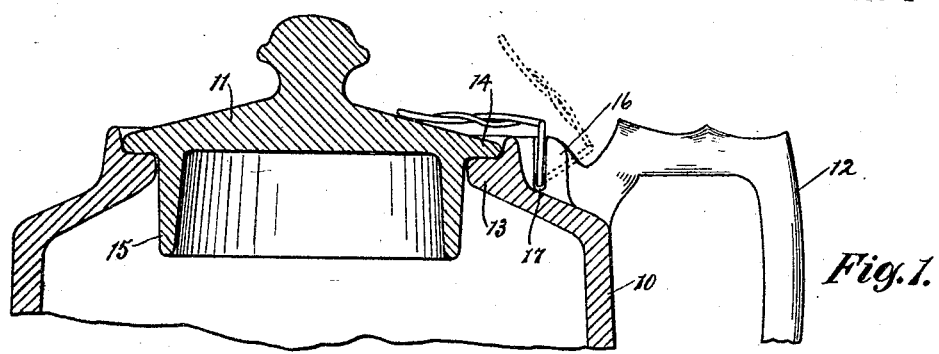
Fig. 1.
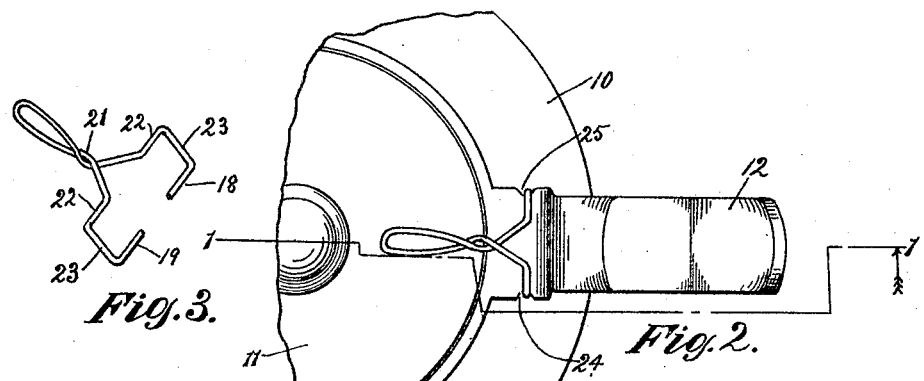
Fig. 3.   Fig. 2.
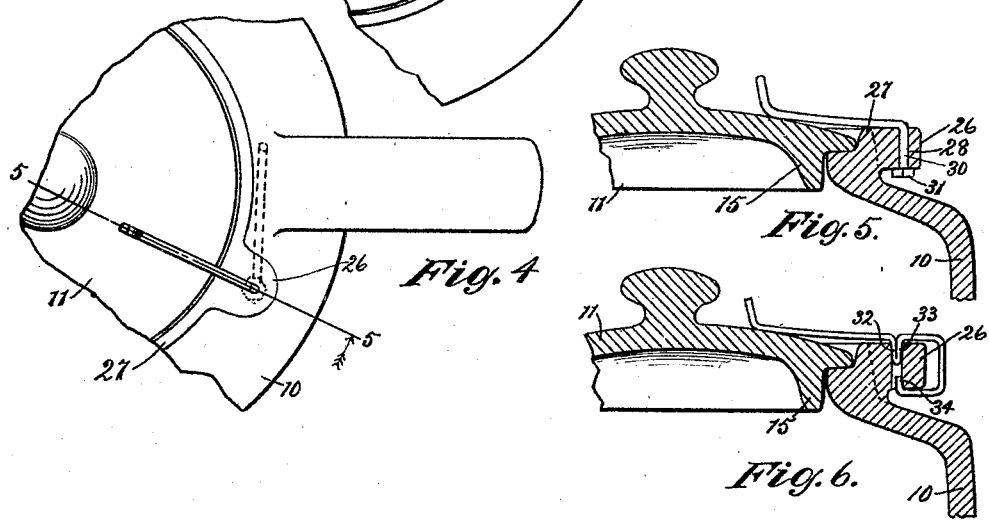
Fig. 4   Fig. 5.
Fig. 6.
Inventor:
Richard P. White
By
Attys.

Aug. 11, 1925.
R. P. WHITE
1,548,861
HOLDER FOR VESSELS HAVING REMOVABLE LIDS
Filed March 20, 1922    2 Sheets-Sheet 2
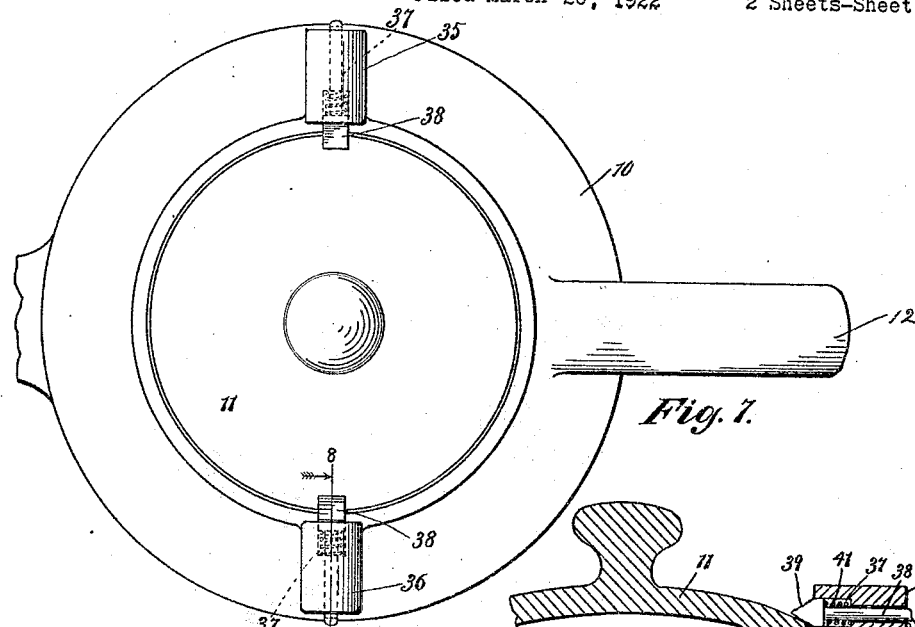
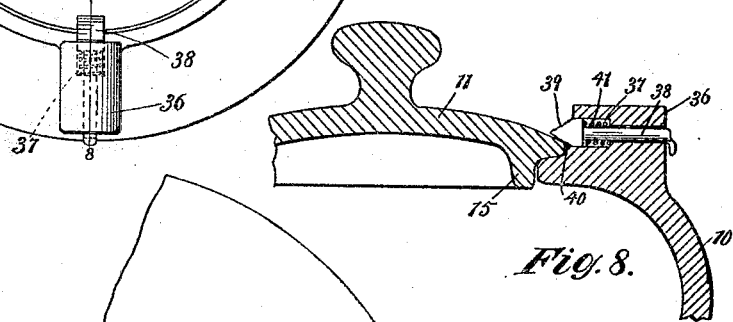
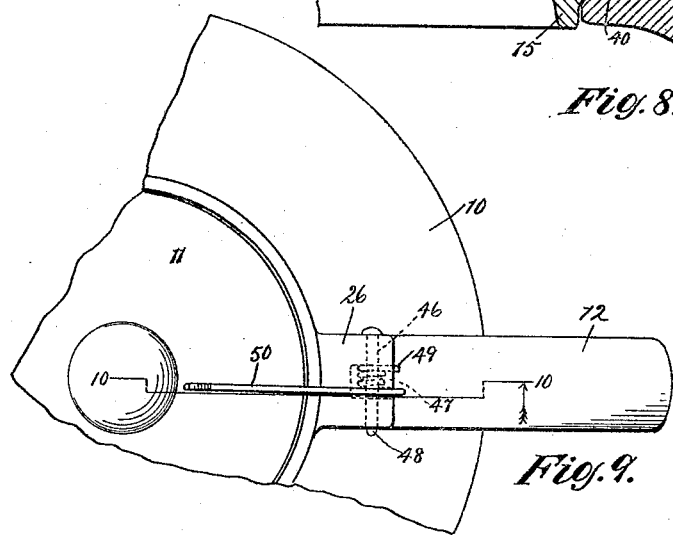
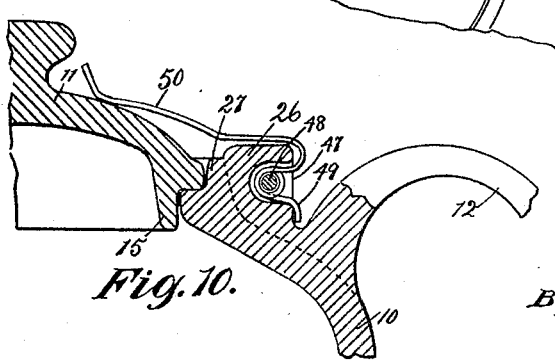
Inventor:
Richard P. White
By Tilson & Tilson
Attys.

Patented Aug. 11, 1925.

1,548,861

UNITED STATES PATENT OFFICE.

RICHARD P. WHITE, OF CHICAGO, ILLINOIS.

HOLDER FOR VESSELS HAVING REMOVABLE LIDS.

Application filed March 20, 1922. Serial No. 545,169.

*To all whom it may concern:*

Be it known that I, RICHARD P. WHITE, a citizen of the United States, and resident of Chicago, county of Cook and State of Illinois, have invented certain new and useful Improvements in Holder for Vessels Having Removable Lids, of which the following is a specification and which are illustrated in the accompanying drawings, forming a part thereof.

The invention relates to lid holders for vessels having removable lids, such as coffee and tea pots, or the like. The object of the invention is to provide a simple attachment adapted to prevent the lid of the vessel from dropping off accidentally while the contents of the vessel are being poured.

Illustrative embodiments of the invention are shown in the accompanying drawings, in which Fig. 1 is a vertical section on the line 1—1 of Fig. 2 showing a vessel lid provided with a preferred form of my invention, the body of the vessel itself being shown fragmentarily;

Fig. 2 is a top plan view of the same;

Fig. 3 is a perspective view of the lid holder shown removed from the vessel;

Fig. 4 is a plan view similar to Fig. 2, showing a modified form of the invention;

Fig. 5 is a vertical section on the line 5—5 of Fig. 4;

Fig. 6 is a vertical section showing a form of holder differing only slightly from that illustrated in Fig. 5;

Fig. 7 is a plan view of still another modification;

Fig. 8 is a vertical section on the line 8—8 of Fig. 7;

Fig. 9 is a plan view of a fifth embodiment of the invention; and

Fig. 10 is a vertical section on the line 10—10 of Fig. 9.

Referring particularly to the form of the invention represented in Figs. 1 to 3, the body of a vessel or the like is designated by the reference numeral 10, the lid by the numeral 11, and the handle is shown at 12. These parts may be of any desired construction. As shown, an inwardly extending flange 13 is formed at the mouth of the vessel, which is adapted to cooperate with the flange 14 at the outer periphery of the lid 11. The lid is also preferably provided with a deep flange 15, which extends into the interior of the vessel and serves to prevent the lid from falling off when the vessel is tipped to a moderate angle. However, when the vessel is nearly empty there is danger of its falling off if the vessel is tilted too far. To overcome this defect it is proposed to provide a lid holder which will prevent accidental removal of the lid, and which may be moved out of the way when it is desired to remove the lid.

As shown, an additional piece of material of which the vessel is composed is molded at the rear of the lid adjacent the handle 12 of the vessel, the added lug being designated by the reference numeral 16. A hole 17 may be formed therethrough, or a pair of small aligned openings may be bored in opposite sides thereof to receive the ends 18, 19, of the lid holder.

The lid holder is shown as formed of a piece of resilient wire bent to hook form, and preferably twisted, as shown at 21, the ends of the wire being bent outwardly and laterally, as at 22, downwardly to form legs 23, and finally recurved inwardly, the ends 18, 19, being in alignment and adapted to enter the hole 17 or aligned holes in the lug 16. As shown, grooves 24, 25, are also formed in the sides of the lug 16, the legs 23 of the holder being normally held therein by the resilience of the material of which the holder is preferably formed. When in this position it will be seen that the forward portion of the holder rests against the upper surface of the lid and prevents accidental removal thereof, as shown in full lines in Figs. 1 and 2. When it is desired to remove the lid of the vessel for cleaning the same, or for any other purpose, the holder is merely tilted with the lid as shown in the dotted position, the legs 23 being readily withdrawn from the grooves 24, 25.

As shown in Fig. 2, the rear portion of the lug 16 is wider than the front portion. Thus when the holder is tilted rearwardly the lateral faces of the lug exert a cam action which tends to return the holder to the lid retaining position.

Another very simple construction is illustrated in Figs. 4 and 5. A lug 26 may be formed integral with the upstanding rim 27 of the body of the vessel, in which lug a vertical aperture 28 is formed. The lid holder comprises a single piece of wire, or the like, the rear portion of which is bent at an angle to the remaining portion and forms a leg 30, which passes through the aperture 28 and may be secured against removal by means of a head, such as a small nut 31, threaded on the end thereof. The forward portion of the holder is adapted to rest against the top of the lid, as shown in full lines, or may be swung in a horizontal plane to the dotted position shown in Fig. 4 when the lid is to be removed.

Still another simple form of lid holder is shown in Fig. 6, the rear portion being bent downwardly, as at 32, then upwardly in contact with itself, as at 33, the remainder being looped about the rear of the lug 26, the end 34 being bent upwardly and adapted to fit into the aperture 28. This construction does away with the necessity for employing the holding nut 31.

A convenient and reliable means for holding the lid in position, and one which renders the use of a deep flange 15 unnecessary, is illustrated in Figs. 7 and 8. According to this construction a pair of upstanding lugs 35, 36, are shown as formed on the body of the vessel at opposite sides of the lid, each being provided with a countersunk aperture 37 extending axially therethrough, in which is fitted a spring-pressed plunger 38, having inclined cam faces 39, 40, at its forward end. A spring 41 is housed within the enlarged forward portion of the aperture and bears against the rear face of the enlarged head of the plunger. The lid 10 is fitted into position by merely pressing it downwardly against the inclined upper faces 39 of the yielding plungers, which are thus retracted to permit the passage of the flange 13, but are immediately returned to their advanced position by the action of the spring 41, and serve to prevent accidental removal of the lid. The number and arrangement of the plungers may obviously be varied, if desired.

Still another modification is illustrated in Figs. 9 and 10. The lug 26 is transversely apertured, as at 46, and a recess 47 is formed in the rear of the lug intersecting the aperture 46. The lid holder, in this instance, comprises a resilient member, the front portion 50 of which is adapted to yieldingly engage the upper surface of the lid, while its rear portion is wrapped about a transverse pin 48, which extends through the aperture 46. The end 49 of the lid holder is braced against the lower portion of the lug 26.

It will be seen that the invention is applicable to any form of vessel having a removable lid, and that many variations from the forms herein described may be made without departing from the scope of the invention. For example, it is not essential that an additional lug be secured to the body of the vessel in order to furnish a support for the lid holder. In the forms illustrated in Figs. 1 to 6 and 9 and 10, the lid holder might be mounted in the handle of the vessel itself, an aperture, either vertical or transverse, being formed therein for that purpose. In the modification of Figs. 7 and 8, the upstanding rim 27 at the margin of the lid opening might be extended upwardly and provided with apertures in which to house the plungers 38.

It is also obvious that in any of the constructions above described two or more lid holders may be employed, if desired, and may be located at any convenient position adjacent the lid opening.

I claim as my invention—

1. In a vessel having a removable lid, a recessed lug on the body of said vessel, a lid holder formed from a single length of resilient material, bent to form a lid engaging loop and having its ends bent inwardly and trunnioned in said recessed lug, intermediate portions of said holder being bent downwardly and being held inwardly by the resiliency of said material for frictionally engaging the sides of said lug for retaining said holder in raised or lowered position, said loop when in lowered position being in engagement with said lid but unattached thereto, whereby said lid may be removed by raising said holder and said holder may be removed by spreading said ends for disengaging the same from said lug.

2. In a vessel of the class described, in combination, a removable lid having a deep, peripheral flange extending into the interior of the vessel, an extension on said vessel provided with cam surfaces, a lid holder having a resilient portion interlocked with said extension and engaging said cam surfaces, and having a portion engaging the upper surface of said lid for holding the same in position.

3. In a vessel of the class described, in combination, a removable lid having a deep peripheral flange extending into the interior of the vessel, a rigid extension having cam faces secured to said vessel and a lid holder having means for engaging said cam faces for resiliently holding said lid on said vessel.

4. In a vessel having a removable lid, in combination, a lug secured to the body of the vessel adjacent the lid opening and having an aperture therethrough, a lid holder having opposed ends resiliently held in said aperture, and having its front portion adapted to be moved into or out of contact with the upper surface, said holder and lug cooperating to resiliently retain said lid in position on said vessel when the front portion of said holder is moved into engagement with the upper surface of said lid.

5. In combination, a vessel, a removable lid therefor, a lug carried by said vessel, said lug having grooves and an opening therein, and a lid holder having a looped portion for engaging said lid and having its ends formed into oppositely arranged return bends for engaging said grooves and opening whereby said holder is resiliently held in engagement with said lid or out of contact therewith.

6. In combination with a vessel having a removable lid, an integral resilient lid holder having its rear portion trunnioned in an aperture formed in the vessel body adjacent the opening, and means including cam surfaces for normally holding the forward end of said holder in yielding contact with the upper surface of the lid.

RICHARD P. WHITE.